(12) United States Patent
Barnett

(10) Patent No.: US 6,958,688 B1
(45) Date of Patent: Oct. 25, 2005

(54) THEFT TRACKING SYSTEM AND METHOD

(75) Inventor: Donald A. Barnett, Chesapeake, VA (US)

(73) Assignee: Hevel Doajik, LLC, Chesapeake, VA (US)

(*) Notice: Subject to any disclaimer, the term of this patent is extended or adjusted under 35 U.S.C. 154(b) by 174 days.

(21) Appl. No.: 10/456,131

(22) Filed: Jun. 5, 2003

Related U.S. Application Data

(60) Provisional application No. 60/387,143, filed on Jun. 7, 2002.

(51) Int. Cl.$^7$ ............................................. G08B 29/00
(52) U.S. Cl. .................. 340/506; 340/5.92; 340/568.1; 705/22; 705/28
(58) Field of Search ............................ 340/506, 571, 340/572.1, 5.91, 5.92, 568.1; 705/22, 28

(56) References Cited

U.S. PATENT DOCUMENTS

| | | | |
|---|---|---|---|
| 5,809,481 A | * | 9/1998 | Baron et al. .................. 705/14 |
| 6,331,817 B1 | * | 12/2001 | Goldberg ................. 340/573.1 |
| 6,774,811 B2 | * | 8/2004 | Kaufman et al. ...... 340/825.49 |
| 6,834,800 B2 | * | 12/2004 | Okamura .................... 235/385 |

* cited by examiner

Primary Examiner—Daryl C Pope
(74) Attorney, Agent, or Firm—Williams Mullen PC; Thomas F. Bergert, Esq.

(57) ABSTRACT

A method and system for registering information about a variety of property items either centrally or in distributed fashion enables quick notification of proper authorities when the property item is stolen. The system can invoke police authority networks and/or a private security system network. Various types of information can be stored in a central database accessible over a public network such as the Internet, or locally on a personal credential item, such as a security card carried with the owner/user of the property item. Information types can include descriptive textual information, visual information, and auditory information about the property item and its owner or user. When the item is discovered stolen, the card can be scanned at a variety of participating card reader devices, which can include ATM machines, retail point-of-sale scanners, gas station pumps, and any other properly equipped public/private/commercial devices. In this way, the system of the present invention automates the notification of proper authorities, and/or the public in general via a network, which may be the Internet, of the theft of a particular property item.

25 Claims, 3 Drawing Sheets

THEFT TRACKING SYSTEM AND METHOD

CROSS-REFERENCE TO RELATED APPLICATIONS

The present application claims priority from U.S. Application Ser. No. 60/387,143, filed Jun. 7, 2002.

FIELD OF THE INVENTION

The present invention relates to property item theft deterrence, and more particularly to a system and method for empowering property owners or renters to quickly notify public or private authorities of stolen property using one of several available means.

DESCRIPTION OF THE ART

Theft of physical property items causes emotional and financial stress, and the financial investment in physical security and insurance against theft rises significantly every year. Standard efforts at deterring theft include home, office and automobile alarms and access control systems, as well as post-theft recovery systems such as that offered by LoJack™ Corporation. Such systems help deter theft in some senses, but do not assist in providing the proper authorities with the immediate notification of important information about the property item to enable its quick recovery.

SUMMARY OF THE PRESENT INVENTION

The present invention provides a method and system for registering information about a variety of property items either centrally or in distributed fashion, which enables quick notification of proper authorities when the property item is stolen. The system can invoke police authority networks and/or a private security system network. Various types of information can be stored in a central database accessible over a public network such as the Internet, or locally on a personal credential item, such as a security card which can be carried with the owner/user of the property item. Information types can include descriptive textual information, visual information, and auditory information about the property item and its owner or user. When the item is discovered stolen, the card can be scanned at a variety of participating card reader devices, which can include ATM machines, retail point-of-sale scanners, gas station pumps, and any other properly equipped public devices. In this way, the system of the present invention automates the notification of proper authorities, and/or the public in general via a network, of the theft of a particular property item. In one embodiment, the network is the Internet.

DETAILED DESCRIPTION OF THE PREFERRED EMBODIMENTS

Figure 1:
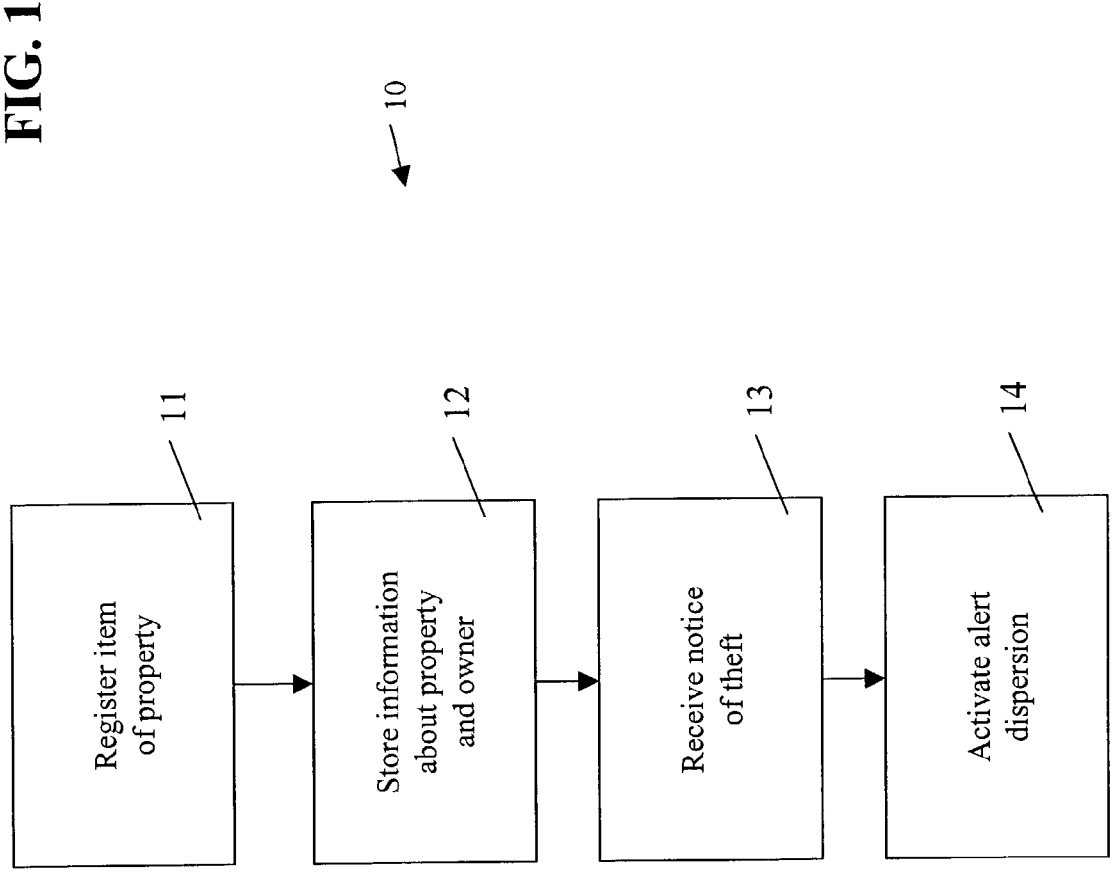
FIG. 1 shows a diagram of steps in accordance with one embodiment of the present invention.
Figure 2:
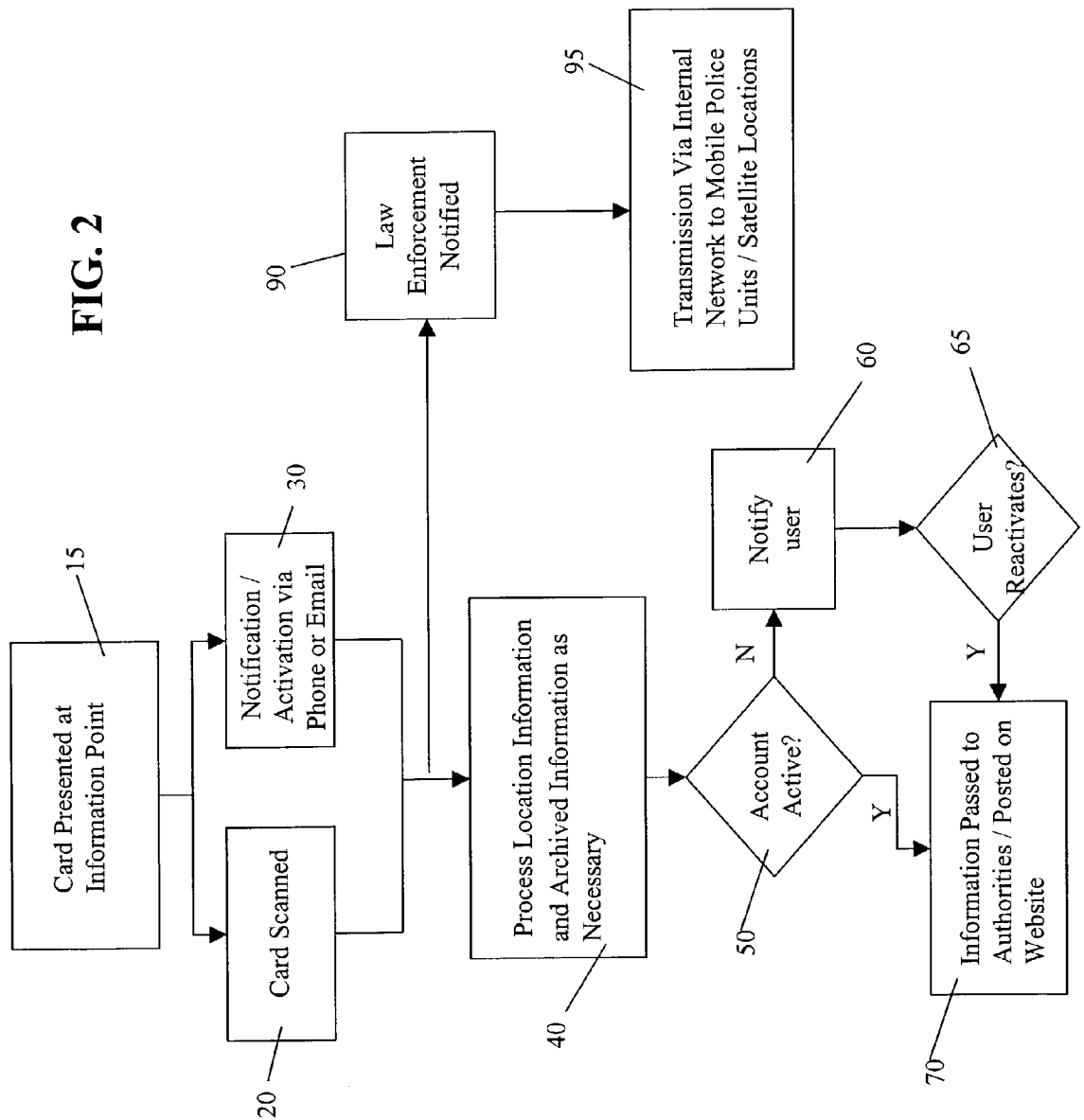
FIG. 2 shows a diagram illustrating information flow in accordance with one embodiment of the present invention.
Figure 3:
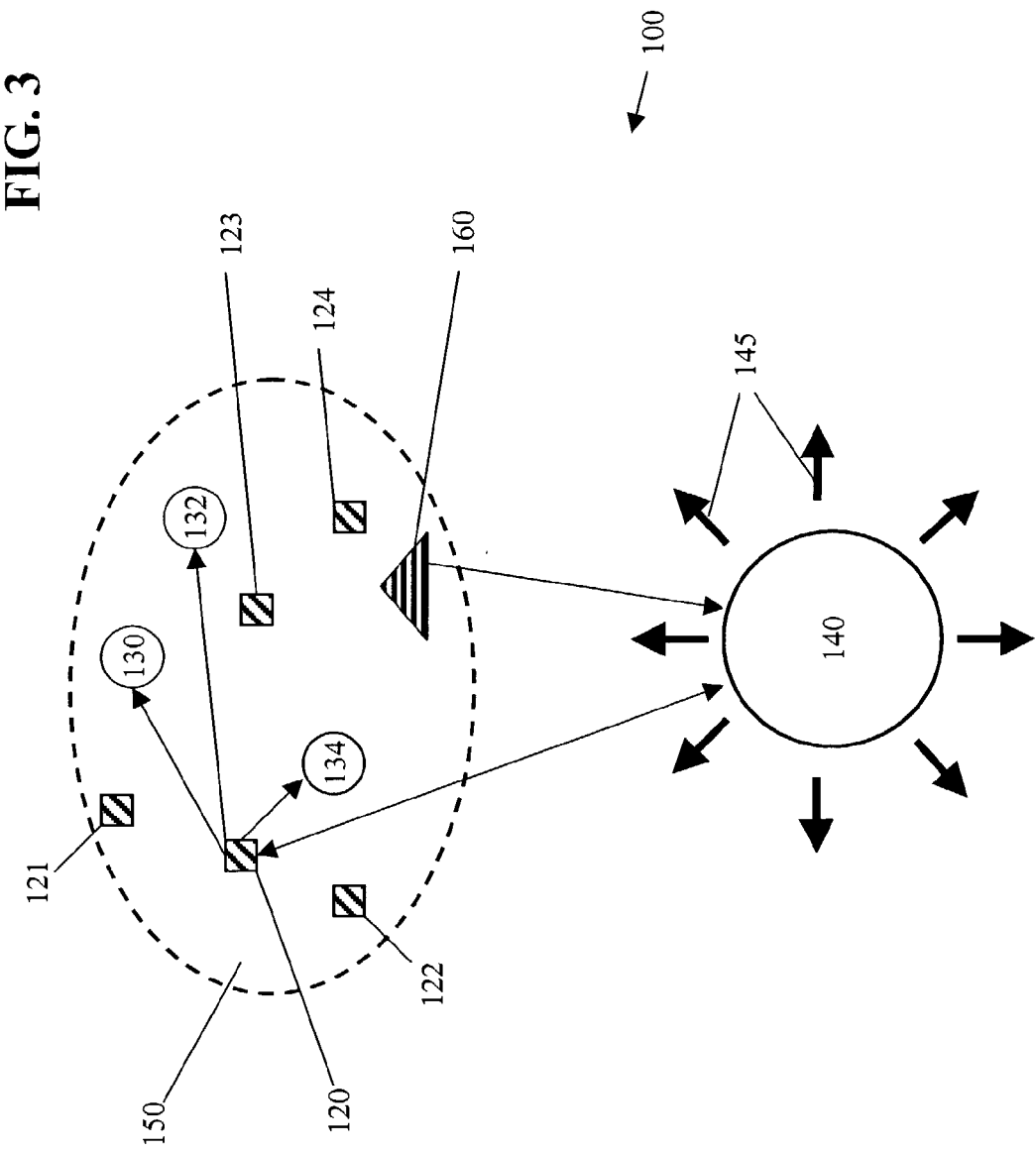
FIG. 3 is a schematic diagram illustrating the dispersion of information upon the activation of the system at an information point in accordance with one aspect of the present invention.

As shown in FIGS. 1 through 3, there is provided a theft tracking system and method which can notify authorities such as a law enforcement agency, a security firm or even an Internet web site upon being notified of a property item's theft by the item's owner or user. In accordance with the method 10 as shown in FIG. 1, a user can first register an item of property with the system of the invention as at 11. Registration can consist of conveying certain information items to a database to specify the product and ownership. In one embodiment, property owners or users can be provided with a security card and subsequently enrolled in a network-enabled security system as provided by the present invention in connection with particular property items.

Registration can occur at the point of purchase/rental/delivery, or after the product has been purchased/transferred/rented. For example, a consumer may purchase a motorcycle in a motorcycle store and may choose to register the motorcycle in the system at the time of purchase. Or, the motorcycle manufacturer may register the user as part of the purchase in the store. Registration at point of purchase can occur via network-enabled point-of-sale (POS) devices which allow retailers to communicate registration information to a central server/hub in accordance with the present invention. Information may be keyed in at the POS device by a retailer or the user, or may be scanned in using barcode or other known scanning techniques familiar to those skilled in the art. Separately, the consumer may be empowered to register the personal property with the system of the present invention after the purchase, such as over the telephone or using the Internet. The user may be given a pass-code or other credential at the time of purchase with which to register the personal property.

When the personal property is registered, or as it is being registered, the consumer can be provided with a notification credential for use if and when the property item becomes stolen. The notification credential can take many forms, and the system notification process can occur in several redundant ways. The types of credential forms can include, for example, a user name and password for use either by telephone, by private network or by Internet, or a security card for use with existing information transfer networks, such as an integrated automated transfer machine (ATM), for example.

As at 12 in FIG. 1, information on property items can be registered centrally, or can be stored on the security card, or both. The property item can be merchandise sold by a particular manufacturer or a particular retailer, or can be property the user wishes to register on their own. Further, the property item can be corporate property, rental property, personal property or otherwise. As an example, retailers and manufacturers may choose to offer membership in the system of the present invention as part of their product sales, or as an optional value-added service to the consumer.

Information to be stored can include, for example, size, weight, color, options, SKU numbers, and other textual identification information, as well as photo images, video images or other visual identification information. It will be appreciated that the amount and type of information to be stored can be determined by the consumer or by minimum levels of information required by local government authorities to appropriately track the property item if and when it becomes stolen, for example. The ownership information to be stored can include textual, visual, and even biometric information (e.g., auditory, finger print) which will properly confirm the identity of the owner or user if and when the user's property item becomes stolen. In one embodiment, photo information can combine identification of the owner or user of the property item along with the property item itself. Such combination can help in proving ownership or usage of the item, and can further assist in identifying the owner or user if the person happens to become lost or abducted in addition to the property item.

Once the item has been registered and appropriate information stored, the card holder can then initiate security calls as at 13, and alert dispersion can occur as at 14 in accordance with the methods described hereafter. In one embodiment, notification can occur by use of the security card, which can then implement the emergency system of the present invention that acts as an aid in the report and recovery of stolen items, such as motorized vehicles, and in theft deterrence.

A security card in accordance with the present invention can have an appearance like any of a variety of plastic credit-card-sized cards that utilize a smart contact/contactless chip. In one embodiment, the card can be an all-inclusive source of information for a specific piece of property. As used in the case of a motorized vehicle, whether it is private, rental or corporate property, the card can contain information such as the vehicle identification number, a photo, the registration information and pertinent details that can provide positive identification of ownership. In a further embodiment of the invention, the card can be used to store information about multiple property items, and the card holder would be prompted to identify the property item stolen at the time of activation of the card.

In a preferred embodiment, the system of the present invention is based upon the abilities of a family of cards known as smart cards. The typical smart card has a microprocessor or memory chip embedded in it that, when coupled with a reader, has the processing power to serve many different applications. Smart cards differ from previous generations of utility cards due to the implementation of the microprocessor or chip. These chips vary in their abilities and are constantly evolving to provide for more memory space as well as increased and varying functions performed by other data processing units such as desktop computers. In accordance with the present invention, the card functions to store information in the form of text and photos, hold the initiating key for connection to the system, and transfer that information to the system hub via a card reader. The card can thus be the initiating key and the information storage unit, while the card reader/modem is the sender of information. The information point that is participating in the security system network will have designated recipients to send information to, to include the system hub which further processes the information and makes further decisions as to what to do with the information. In a particular embodiment, the card can be a Giesecke & Devrient™, GemPlus™ or Schlumberger™ product capable of holding the desired information to be read by a reader/scanner.

In one embodiment of the invention, the card integrates with existing information transfer networks such as the automated teller machine (ATM), point of sale card readers (POS readers), pay phones and a multitude of other card reader applications that can be wired for on-line transaction/ transmission. In a residential setting, for example, the property item holder has several options for the deployment of the card. The first option is the World Wide Web approach through a personal computer. A second option is via the lines of communication that are already established for a home security system. A third option is a direct connection via card reader/modem. With several available forms of implementation, the card can provide expeditious delivery of precise information that can be easily retransmitted, viewed and processed into tangible materials for use by authorities in property recovery.

It will be appreciated that the credential item is not limited by the present invention to a smart card-type device. Rather, with the proper hardware infrastructure in place, other storage/transmission vehicles can be employed having far greater memory and functional capabilities than, for example, a chip on a smart card that may be limited to kilobytes. For example, the present invention can employ memory sticks or discs in lieu of a smart card.

In accordance with one embodiment of the invention, FIG. 2 illustrates the information flow 10 that can originate from the scanning/reading of information contained on the memory device or card. As at 15, the memory device or card is presented at an information point, which can be a compatible card reader that transmits information (e.g., via modem or wireless connection) to designated recipients and the security hub for processing. The communication can be via Plain Old Telephone System (POTS), cellular network, Personal Communications System (PCS) or Internet communications network. The hub can include a server accessible via the Internet, having a processor, memory, communications and input/output as is known in the art. The hub can employ a standard, secure Internet architecture with standard data storage and access, and can include firewall protection, a web server, an application server and system database.

As at 20, the reader successfully scans the card, the modem is successfully connected to the intended receivers and the information contained on the card is passed to the intended receivers. As at 30, in the event the card is lost/stolen/damaged or the information point is inoperative/ not available, activation of the system can optionally be initiated via telephone or email notification. In order to activate the system in such a manner, an optional backup of the information contained on the card would be invoked on the security system database. In one embodiment, the notification goes to a live operator, whereby the consumer can be verified and the location of notification and desired assistance can be more expeditiously acquired.

It will be appreciated that the present invention can also provide for updating information about the property item, including ownership or characteristics. For example, if the property item receives upgrades, changes color or other physical attribute, or is sold or transferred to another party, the card and/or system database can accommodate the new information.

As at 40, the system hub receives information from the card and the location/point of origin. The system hub can be operated by a security firm, for example, and the received information can include audio and video feeds if available. The hub can determine the location of the user giving notification of a stolen item. In one embodiment, location information can be determined according to registered email addresses for the information points (e.g., 120–124 in FIG. 3). The email notification can extend to all appropriate authorities according to the determination mechanisms described. Mobile users, i.e. card reader cell phones or personal digital assistants (PDAs) capable of transmitting notifications can operate by sending an email or voice message (e.g., by toll-free number) to the Mobile Tracking Division of the security firm who can then locate the nearest authority in the registry and accordingly forward the data packet and the owner location information. If the mobile user has a device capable of sending GPS determined location information with the data packet, this intermediate step can be obviated.

In one embodiment, the hub can also determine the location where the item was stolen by requesting and receiving additional information from the user. The system hub can also determine status of the user or item account as at 50, acting further only if the status is active or valid, and then begin the notification process with the nearest authorities. In one embodiment of the invention, as a courtesy service to the cardholder, an inactive card account will activate the system one-time only after expiration date, and the owner will be notified of the inactive status. In another embodiment, once the account is determined to be inactive, the system can send notification to the user as at 60, and can present the user with the option to re-subscribe to the service in connection with the present invention, as at 65. If the card/account is determined to be active, or if the user reactivates the account, appropriate security or other authorities can be notified, as at 70.

As at 90, police departments authorized as information points will be able to view information directly after the notification is sent; however, transmission to the hub is still required to execute all functions of the hub, which again can be operated by a security firm. As at 95, information can be passed along an available police internal network or intranet system prior to or concurrently with processing through the hub. This direct interaction between property owner and police department can act to dissuade illegitimate claims, and the time of entry into the system and dispersion may be decreased to some degree. In a further embodiment not shown in the diagram of FIG. 2, once the information has been read into the police system, it can be passed to the central system (hub/server/database) for follow on processing.

FIG. 3 illustrates the dispersion of information 100 in accordance with programming effectuated at the information point. In one embodiment, the alert dispersion in accordance with the present invention can include the dispersion of information after the location comparison is completed by the hub 140. The alert determination process can be determined by comparing locations of available authorities or security resources and the location of the point of user notification. In one embodiment, the hub includes a database of all available authorities which may be notified of property theft. The hub can include programming for determining a subset of the complete set of authorities, wherein the subset is determined and notified according to information about the theft, including where the notification occurs, details about the property item, and previously stored notification rules provided from any of the authorities. The identified location where the user activated the memory device for notification is shown at 120. Other areas where notification may be implemented are shown at 121, 122, 123 and 124. Successive notification can be provided first to an appropriate entity (e.g., police department or patrol member) at 130, then on to 132 and 134 as necessary. In one embodiment of the present invention, the entire country/world could be sequentially notified. However, after a certain distance, web site notification only may be sufficient due to the real limitations of conventional time versus travel capabilities.

For example, if a user discovers the theft of a property item and uses a security card in accordance with the present invention to notify the system of the present invention of the theft, the present invention will first determine the location where the notification is taking place. For the sake of this example, the notification can take place at an ATM location.

The present invention can then determine an authority notification range geographically based on the location of user notification. In this example, the range may be all authorities within 30 miles of the notification location (i.e., where the ATM is located). This initial determination can be adapted based on those authorities who desire to know of the theft regardless of location, and those authorities who desire NOT to know of the theft regardless of proximity. This determination can further be adapted to notify authorities who desire notification because of particular stored information about the item or the user. Ultimately, those who desire or require notification based on item, user or location information are notified by the present invention. Additional notification procedures can be implemented according to whether the item is recovered or detected within a certain period of time. For example, if the item is not discovered within one hour, the geographical notification component may expand the subset of authorities to be notified based on geographical rules. These rules may be pre-determined by the system of the present invention according to historical criminal records of thefts and recovery.

In another aspect of the present invention, the hub can also post information in real-time to an Internet web site, to allow those accessing the web site to provide information known or discovered related to the stolen item. Verification of activation is not required, but occurs in the preferred embodiment and is possible if a communication link exists at point of origin.

The area of predetermined coverage of the initial information push from a designated, stationary information point is shown at 150. Mobile users 160 can, in one embodiment, send location information such as a GPS determined location along with the data transmission. Hub 140 determines if further dispersion (e.g., as at 145) is required and makes the posting to the website.

In one embodiment of the invention, a card can be scanned from an ATM outside a service station and mobile police units can have the information in a matter of seconds. In a further embodiment of the present invention, the card holder can receive a message where possible that the security firm operating the hub or that the proper police authorities have received notification of the theft. In still another embodiment of the invention, the card holder can receive any updated information available on the theft tracking by subsequent card activations. This information may include notice of the stolen item having been found, or notice that the item had been seen, for example. Additionally, after the card holder has initiated the notice of theft, the card holder may access the Internet to discover whether the property item had been located, or the card holder may pass the card through another system reader. Appropriately equipped readers may provide a viewable message to the card holder with any available update information on the efforts to track the stolen property item.

The notification can include data (e.g., text, photo information) contained within an email, making it very easy to forward information quickly to anyone interested. The email format can easily be modified to fill-in a police-style report that could be used as an official document once verified by proper authorities and signed by an individual making the report. In one embodiment, owners of the property can appear in the photo, as an initial proof of ownership and as a means of having a current photo if the case should turn into a missing person situation. Also, date, time, and location stamps for each authorized dealer can be developed as well as encryption so bogus information/cards cannot infiltrate the system.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed and desired to be secured by Letters Patent is:

1. A method for reporting property theft, comprising the steps of:
   (a) establishing a user account related to at least one item of personal property;
   (b) storing information related to said at least one item;
   (c) receiving notice that said at least one item has been stolen;
   (d) determining whether said account is active; and
   (e) issuing an alert.

2. The method of claim 1 wherein step (a) includes the step of issuing at least one memory device to a user, and wherein step (b) includes the step of storing said item information on said memory device.

3. The method of claim 1 wherein step (b) includes the step of storing said item information on a central server accessible via the Internet.

4. The method of claim 1 wherein step (b) includes the step of storing photograph information for said user.

5. The method of claim 4 wherein said photograph information includes a photograph of said user and said at least one item of personal property.

6. The method of claim 1 including the further steps of receiving updated information about said item of personal property and storing said updated information.

7. The method of claim 1 wherein step (d) includes the step of posting information about said stolen item on an information network.

8. The method of claim 1 including the further step of notifying said user upon location or retrieval of said item.

9. The method of claim 1, including the further step of, upon determining said user account to be inactive, issuing a request to re-activate said account.

10. The method of claim 1 wherein steps (a) and (c) are performed by at least one of:
    said user, a retailer, a product manufacturer.

11. The method of claim 1 wherein step (d) includes the step of alerting at least one of: police department, security provider, Internet web site.

12. The method of claim 2 wherein said device is a credit-card-sized card and wherein step (c) includes the step of reading said card via a remote card-reading device, said card-reading device being connected via network to a central alert notification system.

13. A system for reporting property theft, comprising:
    an account management component for managing at least one user account, said account being related to at least one item of personal property;
    a storage component for storing information related to said at least one item;
    a notification component for providing notice that said at least one item has been stolen, said notification component including means for determine whether said account is active; and
    an alerting component for notifying an authority of said stolen item.

14. The system of claim 13 wherein said account management component is a central server accessible to said notification component and said alerting component via network connection.

15. The system of claim 13 wherein said account management component includes means for editing said information related to said at least one item.

16. The system of claim 13 wherein said storage component is a card having, a memory and capable of being read by said notification component.

17. The system of claim 16 wherein said notification component includes a card-reader device connected via network to said alerting component.

18. The system of claim 13 wherein said notification component includes means for receiving re-activation information.

19. The system of claim 13 wherein said alerting component includes means for alerting at least one of: police department, security provider, Internet web site.

20. The system of claim 13 wherein said notification component includes means for determining a geographical location associated with said user.

21. The system of claim 13 wherein said notification component includes means for determining a geographical location associated with said property item at the approximate time of said theft.

22. The system of claim 21 wherein said alerting component includes a database of available authorities to be alerted and means for determining a subset of said authorities for alerting according to said determined geographical location.

23. A security information device, comprising:
    means for storing user identity and property information, said information including image and text information;
    means for presenting said information to a security system so as to alert at least one authority of a theft of property, said security system including an account management component for storing user account information, a notification receiving component for receiving said presented information and determining a geographical location where said information is being presented, and an alerting component for alerting at least one authority determined to be appropriate based on said determined geographical location.

24. A theft tracking and notification system, comprising:
    means for storing information about at least one property item and a plurality of notification authorities;
    means for receiving notification of a theft of said at least one property item;
    geographic alert determination means for determining a first subset of said plurality of authorities to alert to said theft based on said stored notification authority information; and
    property item alert determination means for determining a second subset of said plurality of authorities to alert to said theft based on said stored property item information.

25. The method of claim 2 wherein the step of issuing said memory device includes providing a security card to a user associated with said user account, said card being substantially similar in appearance and surface information content to a membership card, so that an uninformed user of said card is not likely to discern that the card is not a membership card.

* * * * *